Nov. 21, 1933.  W. G. G. GODRON  1,936,430
SEALING DEVICE
Filed Feb. 3, 1933
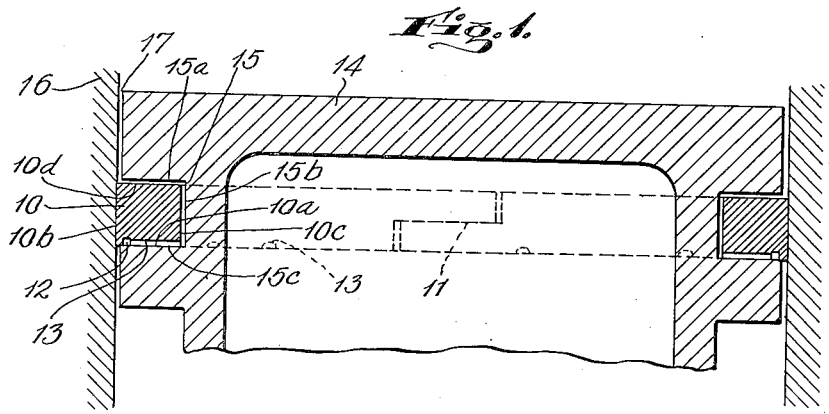
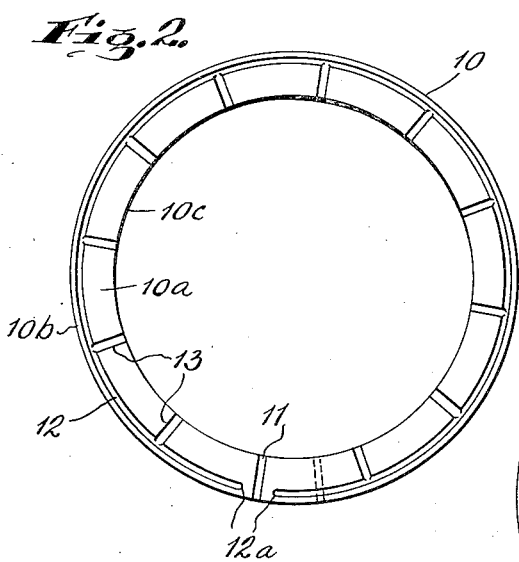
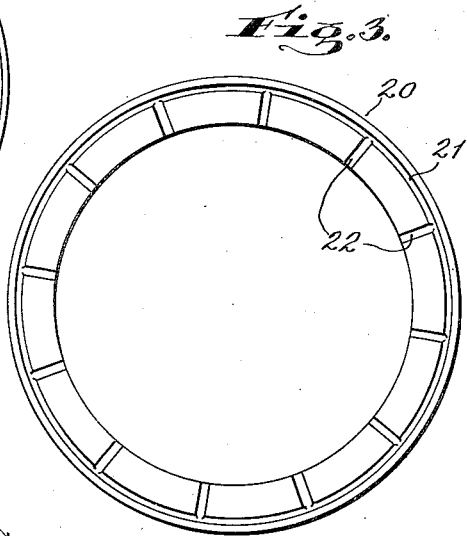
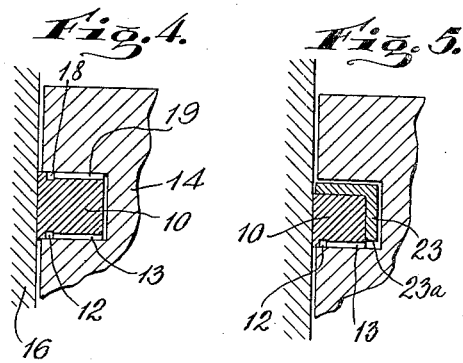
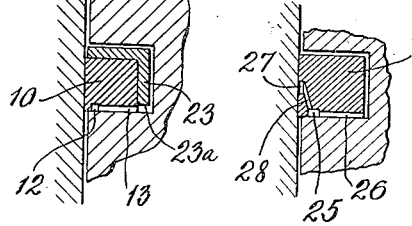
INVENTOR.
WILLIAM G. G. GODRON
BY
ATTORNEY Patented Nov. 21, 1933

1,936,430

UNITED STATES PATENT OFFICE 1,936,430

SEALING DEVICE

William G. G. Godron, New York, N. Y.

Application February 3, 1933. Serial No. 655,026

9 Claims. (Cl. 309—31)

This invention relates to piston rings and similar sealing devices used in connection with the cylinders of engines, pumps, compressors and the like; and the object of the invention is to provide a ring with an annular groove on the surface thereof opposite the surface exposed directly to the prevailing pressure in a cylinder, with means for placing the blow-bye pressure in communication with said groove to relieve the pressure of the groove surface of the ring in the adjacent wall of the ring groove of the piston, permitting the free radial movement of the ring with respect to the piston or the piston with respect to said ring to facilitate maintaining the piston in proper, centralized position with respect to the cylinder and to eliminate wear on the side walls of the piston as well as the bore of the cylinder as commonly experienced in all types of internal combustion engines, pumps, compressors and the like; a still further object being to provide means for exposing the prevailing pressure to the outer surface of the ring or the surface thereof engaging the cylinder wall as well as to all other surfaces of the ring so as to provide a substantially full floating ring capable of performing its sealing functions without being subjected to the excessive pressures that may prevail or to which the ring would be otherwise exposed; a further object being to provide a ring having both upper and lower surfaces thereof grooved for the purpose stated to adapt said ring to double acting pistons of engines, pumps and the like; and with these and other objects in view, the invention consists in a sealing device or ring of the class described, which is simple in construction, efficient in use, and which is constructed as hereinafter described and claimed.

The invention is fully disclosed in the following specification, of which the accompanying drawing forms a part, in which the separate parts of my improvement are designated by suitable reference characters in each of the views, and in which:

Fig. 1 is a sectional view through a part of a piston showing one ring made according to my invention mounted therein.

Fig. 2 is a plan view of the ring shown in Fig. 1, detached.

Fig. 3 is a view similar to Fig. 2 showing a modification; and,

Figs. 4, 5 and 6 are views similar to Fig. 1, showing only a part of the construction and showing other forms of my invention.

In sealing devices or rings of conventional form, it has been experienced that excessive wear on the rings, cylinder walls and even on the piston takes place in a relatively short period of time, and especially in dealing with apparatus operating under high pressures; and after long and careful study, I have found that the cause of the excessive wear is due to the fact that the prevailing pressure to which one surface of the ring is exposed forces the other surface of the ring into firm engagement with the corresponding surface or wall of the ring groove in the piston to such a degree that in some instances no relative movement whatever is provided between the ring and piston.

It is the principal object of my invention to provide means for relieving the pressure of the ring on the wall of the ring groove of the piston, thus permitting free radial movement of the piston with respect to the ring, and vice versa, which will operate to more definitely and accurately retain the piston in centralized relation within the cylinder and eliminate the excessive wear above referred to, as well as to provide a freer action of the piston by eliminating the friction caused by the faulty structural arrangement now commonly employed in engines and other apparatus.

I also find that by exposing the prevailing pressure to the outer surface of the ring or an annular groove formed therein, I provide a substantially full floating ring wherein the frictional engagement of the ring with respect to the piston as well as the cylinder wall is substantially eliminated, and yet the ring will maintain its sealing properties and its resiliency where spring split rings are employed.

In Figs. 1 and 2 of the drawing, I have shown one form of ring construction 10 in the form of a split ring, the split and overlapped ends of which are indicated at 11. With this construction, the lower side surface 10a of the ring is provided with an annular groove 12 arranged adjacent the outer or front surface 10b, the ends of the groove 12 terminating short of the split 11 as seen at 12a and a plurality of radial grooves 13 extend from the groove 12 across the lower surface 10a of the ring to the inner or back surface 10c thereof and open outwardly through the inner surface 10c as clearly seen in Figs. 1 and 2.

In Fig. 1 of the drawing, I have shown at 14 the upper end of a piston or plunger, and at 15, I have shown a ring groove in which the ring 10 is mounted. At 16, I have shown the cylinder wall in which the piston 14 operates. At 17, I have indicated the usual clearance space between the outer surface of the piston and the cylinder wall through which the prevailing pressure at the top of the piston passes to the upper side surface 10d of the ring 10 and between said surface and the upper wall 15a of the ring groove in what is commonly termed the blow-bye. This pressure also passes downwardly between the inner surface 10c of the ring 10 and the bottom wall 15b of the ring groove, and in the construction shown, will pass outwardly and radially through the groove 13 into the annular groove 12, thus exposing both the surfaces 10a and 10a to the prevailing pressure and eliminating the commonly experienced frictional engagement of the ring 10 on the bottom wall 15c of the ring groove, and producing a substantially balanced mounting of the ring within the ring groove 15, permitting free relative movement of the piston and ring with respect to each other in the cylinder 16.

At this time, it will be understood that a certain percentage of the pressure will pass the upper or outermost ring 10, and the next adjacent ring will be of similar construction, and by reason of this fact, the prevailing pressure above the second ring will be equalized on both upper and lower surfaces of the second ring and accomplish the same result as in the first ring, and so on through whatever series of rings or sealing devices are employed.

Where double acting pistons, pumps or plungers are employed, a ring similar to that shown in Fig. 4 will be employed. This ring differs from the ring 10 shown in Fig. 1 simply in adding another annular groove 18 on the upper surface of the ring with radial grooves 19, similar to the grooves 13, so that in the two strokes of the piston 14, the prevailing pressure on the upper and lower surfaces of the ring will be transmitted alternately to the opposed surfaces thereof, as will be apparent.

The structure shown in Fig. 4 while being applied to a ring such as shown in Figs. 1 and 2 may also be used in a ring such as the ring 20 shown in Fig. 3, which differs from the ring in the other figures simply in being of a solid construction rather than split. With this type of ring, the groove 21 is uninterrupted circumferentially and is exposed to the inner surface through the radial grooves 22, which as stated may be on just one surface of the ring or on the upper and lower surfaces thereof as in Fig. 4.

In Fig. 5 of the drawing, I have shown another slight modification wherein I employ in conjunction with a split ring 10, similar in all respect to the ring 10 shown in Figs. 1 and 2, a supplemental split ring 23 of L-shaped cross sectional form, thus producing what is commonly known as a double split ring structure, the ring 23 of which serves to check the blow-bye between the split in the ring 10 by arranging the split of the ring 23 in circumferentially spaced relation with respect to that of the ring 10. With this construction, it will also be apparent that the lower surface 23a of the ring 23 terminates short of the lower surface of the ring 10 so as to provide a clear passage of the blow-bye prevailing pressure into and through the grooves 13 in the ring 10 so as to enter the annular groove 12.

In Fig. 6 of the drawing, I have shown the means for exposing the outer surface of a ring to the prevailing pressure, and in this construction, I have shown at 24 a ring which may be equivalent to any of the rings 10 and 20 shown, provided with an annular groove 25 on one surface thereof with radial grooves 26 to expose the groove 25 to the prevailing pressure. At 27, I have shown on the outer surface of the ring an annular groove which is placed in communication with the groove 25 through a series of ports or passages 28 in the form of holes which are spaced circumferentially of the ring in the manner of the spacing of the grooves 26 as is indicated in Figs. 2 and 3 of the drawing. With this construction, it will be apparent that the ring 24 may be said to be full floating in the ring groove, having all of its surfaces exposed to a prevailing pressure, thus providing a very free and easy action of the ring in the cylinder as well as with respect to the piston or other reciprocating part.

With all the forms of construction shown, it will appear that the grooves 12, 21 and 25 are disposed inwardly of the outer surface of the piston so as to prevent a direct blow-bye of the prevailing pressure as would be experienced if the grooves extended beyond the outer surface of the piston.

As above stated, while there is a leakage of the pressure past the outermost ring or sealing device of a piston, this pressure is materially reduced, and in travelling from ring to ring is substantially eliminated, especially so with my improved ring construction which permits more accurate and positive functioning of the ring as well as the piston in the cylinder and said ring and piston with respect to each other.

It will be understood that while I have shown certain details of construction for carrying my invention into effect and have applied the invention to rings of specific form, my invention is not limited in these respects, and various other changes in and modifications of the construction herein shown and described may be made within the scope of the appended claims without departing from the spirit of my invention or sacrificing its advantages.

Having fully described my invention, what I claim as new and desire to secure by Letters Patent, is:—

1. A sealing ring of the class described having front, back and side surfaces, one side surface of said ring being provided with a circumferentially arranged groove disposed substantially inwardly of the front surface of said ring, said side surface also having circumferentially spaced passages extending from the groove inwardly and opening through the back surface of said ring.

2. A packing ring having a circumferentially extended groove in each of two adjacent surfaces, said grooves being connected by passages extending through said ring, one of said grooves being connected to another surface of said ring by additional radial grooves.

3. A sealing ring of the class described having front, back and side surfaces, one side surface of said ring being provided with a circumferentially arranged groove disposed substantially inwardly of the front surface of said ring, said side surface also having circumferentially spaced passages extending from the groove inwardly and opening through the back surface of said ring, the front surface of the ring having a circumferential groove and passages extending through the ring for placing both of said circumferential grooves in communication.

4. In a reciprocating member having a ring groove, a sealing device in said groove, said device having front, back and side surfaces, one of said side surfaces being exposed to prevailing pressure in the operation of said reciprocating member, and means comprising an annular groove disposed substantially inwardly of said front face, and a plurality of radial grooves in the opposite side surface of said sealing device whereby said opposite side surface is exposed to said prevailing pressure to eliminate excessive friction between said sealing device and said reciprocating member.

5. In a reciprocating member having a ring groove, a sealing device in said groove, said device having front, back and side surfaces, one of said side surfaces being exposed to prevailing pressure in the operation of said reciprocating member, means comprising an annular groove and a plurality of radial grooves in the opposite side surface of said sealing device whereby said opposite side surface is exposed to said prevailing pressure to eliminate excessive friction between said sealing device and said reciprocating member, and means including said first named means whereby the prevailing pressure at the last named side surface of the sealing device may extend to the outer surface of said device without permitting the pressure medium to pass the front lower edge of said sealing device.

6. A sealing device for use in a reciprocating member provided with a groove for receiving said device, said device comprising front, back, and two side surfaces, one side surface of said device being adapted to be exposed to a pressure which normally urges the opposite side surface into contact with an adjacent surface of said groove, said opposite side surface being provided with an annular groove disposed substantially inwardly of said front surface, said device also having a plurality of radial passages extending inwardly from said annular groove to said back surface, said annular groove and radial passages being exposed to the pressure urging said opposite side surface into contact with the surface of said ring groove whereby excessive friction between said opposite side surface and said adjacent surface is eliminated by partially balancing the pressure on said first side surface.

7. A sealing device for use in a reciprocating member provided with a groove for receiving said device, said device comprising front, back, and two side surfaces, one side surface of said device being adapted to be exposed to a pressure which normally urges the opposite side surface into contact with an adjacent surface of said groove, said opposite side surface being provided with an annular groove disposed substantially inwardly of said front surface, said device also having a plurality of radial passages extending inwardly from said annular groove to said back surface, said annular groove and radial passages being exposed to the pressure urging the opposite side surface into contact with said adjacent surface of said ring groove whereby excessive friction between said opposite side surface and said adjacent surface is eliminated by partially balancing the pressure on said first side surface, said front surface having a circumferential groove, and passages placing said annular and circumferential grooves in communication with each other.

8. A sealing device for use in a reciprocating member provided with a groove for receiving said device, said device comprising front, back, and two side surfaces, one side surface of said device being adapted to be exposed to a pressure which normally urges the opposite side surface into contact with an adjacent surface of said groove, said opposite side surface being provided with an annular groove disposed substantially inwardly of said front surface, said device having a plurality of radial passages extending inwardly from said annular groove to said back surface, said annular groove and radial passages being exposed to the pressure urging said opposite side surface into contact with said adjacent surface of said ring groove whereby excessive friction between said opposite side surface and said adjacent surface is eliminated by partially balancing the pressure on said first mentioned side surface, said sealing device also being split and the ends of said annular groove terminating short of the ends of said device at said split.

9. A piston ring for use on a piston provided with a ring receiving groove, said ring comprising front, back, upper and lower side surfaces, said upper surface being adapted to be exposed to a pressure which normally urges said lower side surface into contact with an adjacent surface of said groove, said lower side surface being provided with an annular groove disposed substantially inwardly of said front surface, said lower side surface also having a plurality of radial grooves extending inwardly from said annular groove to said back surface, said annular groove and said radial grooves being exposed to said pressure, whereby excessive friction between said lower side surface and said adjacent surface is eliminated by partially balancing the pressure on said upper side surface.

WILLIAM G. G. GODRON.